United States Patent [19]

Rumyantsev

[11] 4,123,942
[45] Nov. 7, 1978

[54] CENTRIFUGAL GOVERNOR

[76] Inventor: Leonid A. Rumyantsev, ulitsa Bolshaya Akademicheskaya, 77, korpus 3, kv. 79, Moscow, U.S.S.R.

[21] Appl. No.: 829,860

[22] Filed: Sep. 1, 1977

[51] Int. Cl.² ............................................. G01P 3/18
[52] U.S. Cl. ...................................... 73/535; 73/551
[58] Field of Search ......................... 73/536, 551, 535

[56] References Cited

U.S. PATENT DOCUMENTS 2,588,911  3/1952  De Marco ...................... 73/551 X

FOREIGN PATENT DOCUMENTS 671,871    2/1939  Fed. Rep. of Germany ............ 73/551
1,331,596  5/1963  France ..................................... 73/551

*Primary Examiner*—James J. Gill
*Attorney, Agent, or Firm*—Fleit & Jacobson

[57] ABSTRACT

A centrifugal governor whose body accommodates an input element adapted for rotation and a coaxially-arranged output element adapted for axial motion during rotation of the input element under the effect of the weights arranged between them. There also are levers arranged between the input and output elements so that the turning axle of each lever is secured on the input element, one arm of the lever is in constant contact with the output element and the other one contacts the corresponding weight in the course of rotation of the input element, this layout increasing considerably the axial force on the output element.

3 Claims, 7 Drawing Figures

CENTRIFUGAL GOVERNOR

The present invention relates to centrifugal governors.

The centrifugal governor according to the invention will be used most rationally in the power transmission control systems of transport vehicles, namely for hydraulic gearshifting in gearboxes or for controlling the friction locking coupling of a hydraulic torque converter in hydromechanical drives.

PRIOR ART DEVICE AND ITS DISADVANTAGES

Widely known in the prior art are centrifugal governors used in the hydraulic control systems of the power transmissions of transport vehicles comprising a control valve which alternately covers the channels of said system. The centrifugal governors have a body with a coaxially installed rotatable input element, and an output element. Installed between the inlet and outlet elements are weights which, on rotation of the input element, act on the output element, causing its axial displacement.

In the centrifugal governors described above the increment of the axial force on the output element is proportional to the radial movement of the weights. As a rule, the systems of automatic control of power transmissions call for an abrupt shifting of the control valve from one extreme position to the other so as to eliminate stable position (stalling) of the control valve in the middle position in which the channels of the control system are incompletely covered. The speed of displacement of the output element of the centrifugal governor and, consequently, of the control valve can be increased by the action of the weights on the output element if said weights move considerably in a radial direction. However, this leads to an objectionable increase in the size of the governor. At the same time the proportionality of the force increment on the output element to the movement of the weights causes a relatively stable position of the slide valve in the course of its reversal which tells adversely on the performance of the hydraulic control system.

OBJECTS AND BRIEF DESCRIPTION OF THE INVENTION

It is an object of the present invention to reduce the operational time of the centrifugal governor by increasing the force on the output element.

Another object of the invention consists in decreasing the size of the governor.

In accordance with these and other objects, disclosure is made of a centrifugal governor whose body accommodates a coaxially arranged input element adapted for rotation, and an output element adapted for axial motion in the process of rotation of the input element under the effect of the weights located between said elements wherein, according to the invention, the governor is provided with levers located between the input and output elements in such a manner that the turning axis of each of them is fixed on the input element, one arm contacts the output element and the other one, the corresponding weight during rotation of the input element this layout increasing considerably the axial force on the output element.

It is expedient that the surface of each lever contacting the corresponding weight should be curvilinear.

This shape of the lever surface will change the axial force on the output element in accordance with the present law.

The centrifugal governor according to the present invention is comparatively small and, when used in the hydraulic control systems of power transmissions of transport vehicles, shifts the control valves comparatively quickly (abruptly) from one extreme position to the other which improves the performance of said control systems.

BRIEF DESCRIPTION OF THE DRAWINGS

Now the invention will be described in detail by way of example with reference to the accompanying drawings, in which.

DETAILED DESCRIPTION OF THE INVENTION

The example considered here deals with a centrifugal governor used for controlling the hydraulic torque converter of an automotive transport vehicle.

Figure 1:
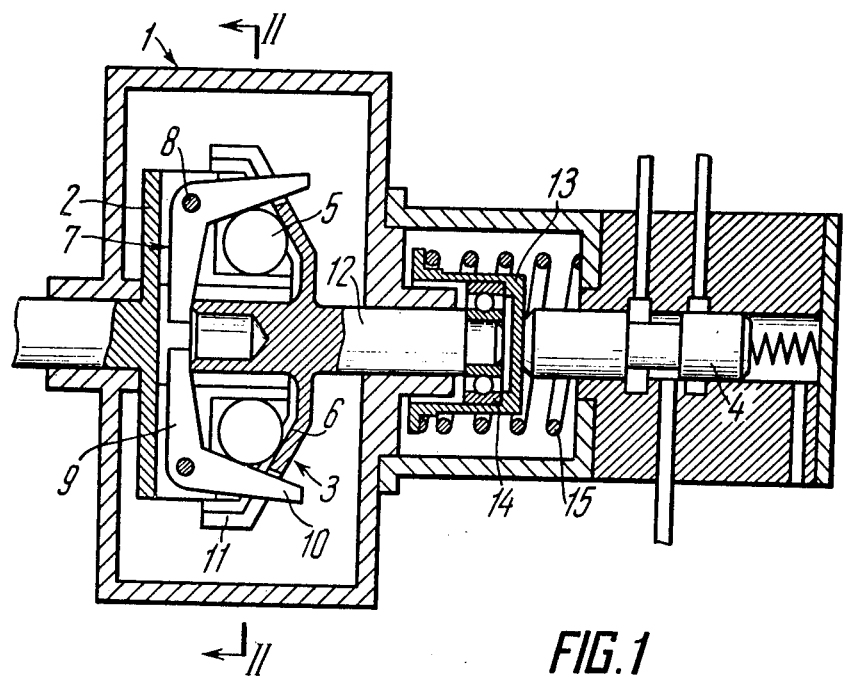
FIG. 1 is a longitudinal section of the centrifugal governor according to the invention.
Figure 2:
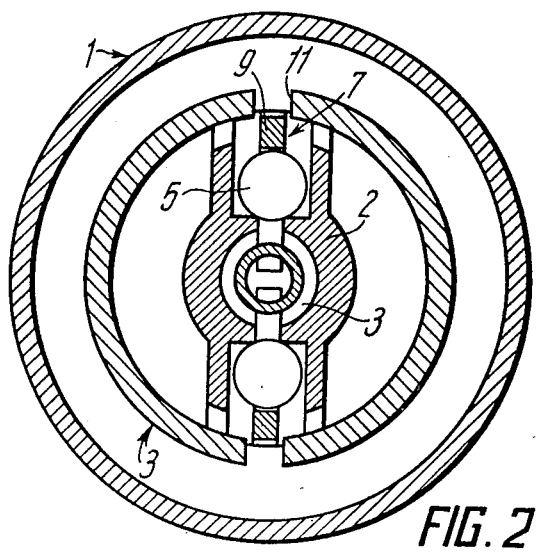
FIG. 2 is a section taken along line II—II in FIG. 1.

The centrifugal governor comprises a body 1 (FIG. 1 and 2) accommodating an input element 2 and an output element 3. For rotating the input element 2, the latter is kineatically linked with the engine shaft (not shown in the drawing) of a transport vehicle. The output element 3 operates the control valve 4 of the torque converter control system.

Located between the input and output elements 2 and 3 are located weights 5. The output element 3 has a tapered surface 6 which is in contact with the weights 5 during rotation of the input element 2.

Located between the input and output elements 2 and 3 are mounted cranked levers 7 whose rotation axles 8 (FIG. 1) are fixed on the input element 2. One arm 9 of each lever 7 contacts the output element 3 whilst the other arm 10 during rotation of the input element 2 contacts the weights 5. To decrease the dimensions of the governor, the output element 3 has ports 11 receiving the ends of the arms 10 of the levers 7. The output element 3 is composed of two parts 12 and 13 interconnected by a bearing 14. A spring 15 located between the body 1 and the part 13 of the output element 3 is intended to return the output element 3 to the initial position.

The provision of the levers 7 in the centrifugal governor makes it possible to increase the force on the output element 3 because during rotation of the input element 2 the weights 5 act on the output element 3 and on the levers 7. In the course of radial movement of the weights 5 the distance from the turning axis 8 of the lever 7 to the point of its contact with the weight 5 increases and so does the force moment caused by the action of the weights 5 on the lever 7. Inasmuch as the distance between the turning axle 8 of the lever 7 and the output element 3 remains practically constant, the force applied to the output element 3 grows.

Figure 3:
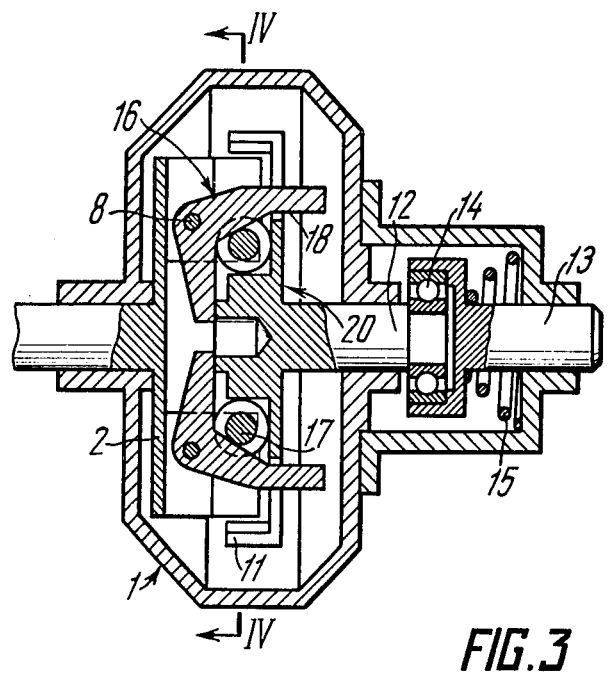
FIG. 3 shows the centrifugal governor according to the invention in which the surface of the lever contacting the weight is curvilinear.
Figure 4:
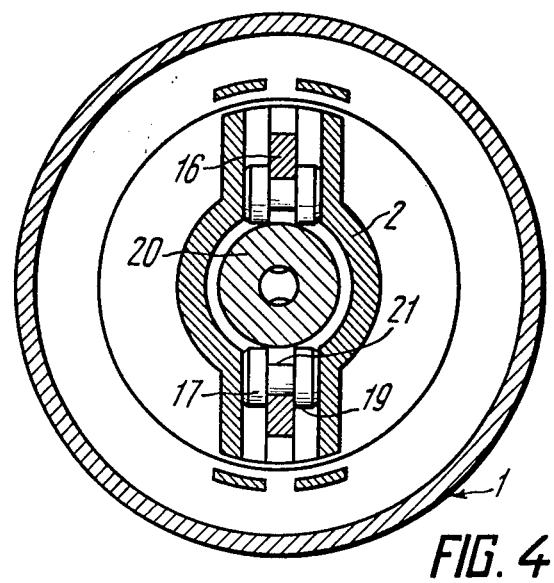
FIG. 4 is a section taken along line IV—IV in FIG. 3.

In the centrifugal governor illustrated in FIGS. 3 and 4 the levers 16 have a surface 18 contacting the weights 17, said surface being curvilinear. This shape of the surface 18 provides for changes in the axial force in accordance with the preset law. The weights 17 are made in the form of stepped rollers whose surfaces 19 (FIG. 4) contact the output element 20 and whose surface 21 contacts the surface 18 (FIG. 3) of the lever 16.

Figure 5:
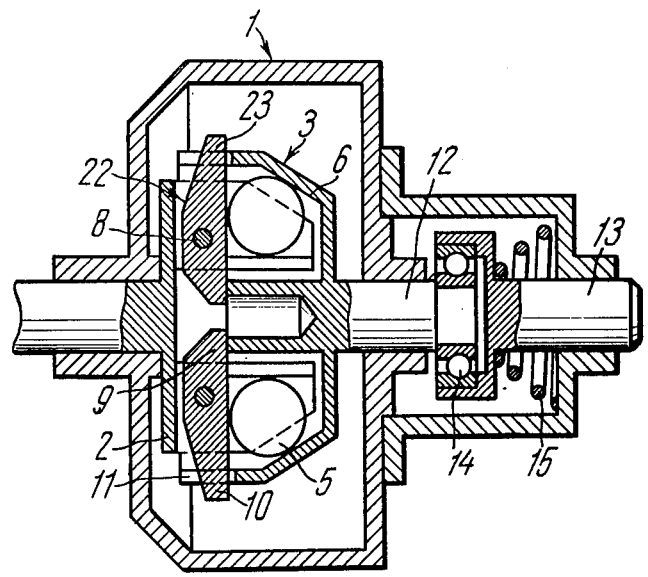
FIG. 5 shows a centrifugal governor with a straight lever.

The levers 22 (FIG. 5) can be made straight and having flat surfaces 23 which contact the weights 5. Such levers are simpler to make and will prove practical in the centrifugal governors with relatively small axial motions of the output element 3.

Figure 6:
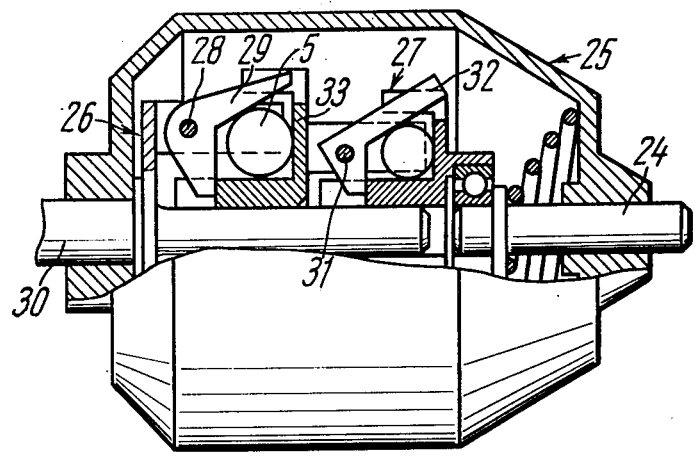
FIG. 6 shows two centrifugal governors arranged in succession.

When a considerable axial force is obtained on the output element 24 (FIG. 6) whose travel is relatively large, it is possible to install two centrifugal governors 26 and 27 arranged consecutively in the axial direction in a single body 25 (FIG. 6). The turning axle 28 of the lever 29 of the centrifugal governor 26 is fixed on the input element 30 whilst the turning axle 31 of the lever 32 of the centrifugal governor 27 is fixed on the output element 33 of the centrifugal governor 26 which serves as the input element of the centrifugal governor 27.

Figure 7:
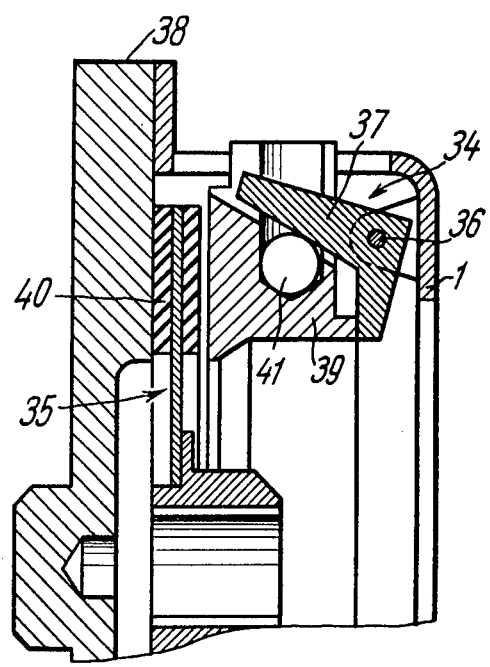
FIG. 7 illustrates the employment of the centrifugal governor according to the invention in a friction clutch for actuating its discs.

Illustrated in FIG. 7 is the employment of the centrifugal governor 34, according to the invention, for engaging the clutch 35 of an automobile for which purpose the turning axle 36 of the lever 37 is fastened to the flywheel 38 of the automobile engine (not shown in the drawing) while the output element 39 of the centrifugal governor 34 serves as a pressure plate for pressing the friction disc 40 against the flywheel 38. The weights 41 are located between the levers 37 and the output element 39.

The centrifugal governor functions as follows.

During rotation of the input element 2 the weights 5 are moved by the centrifugal force in a radial direction and act on the output element 3. The weights 5 also act on the arms 10 of the levers 7 which turn around the axles 8 and their arms 9 act on the output element 3. The latter overrides the spring 15 and moves axially.

Thus, the axial force of the weights 5 and the force produced by the action of the weights 5 on the levers 7 are summed up on the output element 3.

As the rotation speed of the input element 2 increases, the weights 5 move farther apart. This increases the distance from the turning axle 8 of the lever 7 to the point of its contact with the weight 5. Inasmuch as the distance between the turning axle 8 of the lever 7 and the output element 3 remains virtually constant, the force transmitted by the levers 7 to the output element 3 grows. As a result, the output element 3 moves faster and the control valve 4 is changed over also faster.

Other modifications of the centrifugal governor function fundamentally in the same way as the one described above.

I claim:

1. A centrifugal governor comprising: a body; an input element installed in said body and adapted for rotation; an output element installed in said body coaxially with said input element and adapted for axial movement; levers located in said body between said input and output elements; weights located in said body between said levers and the output element; turning axles of said levers secured on said input element; first arms of said levers contacting said output element; other arms of said levers being positioned with respect to said weights in such manner that during rotation of said input element said weights contact and exert a force on said other arms so that said levers turn about their axles and said first arms exert first axial forces on said output element thereby urging said output element in a direction axially away from said input element, said weights directly contacting said output element during rotation of said input element and exerting second axial forces on said output element that extend in the same direction as said first axial forces.

2. A centrifugal governor according to claim 1 wherein the surface of each lever contacting the weight is curvilinear.

3. A centrifugal governor according to claim 1 wherein said weights comprise stepped rollers having first surfaces contacting said output element and second surfaces contacting said other arms of said levers.

* * * * *